United States Patent [19]
Kanehara et al.

[11] Patent Number: 4,955,532
[45] Date of Patent: Sep. 11, 1990

[54] AUTOMATIC TOLL COLLECTOR FOR A TOLL ROAD

[75] Inventors: Koichi Kanehara; Kazumi Fukuda; Masashi Sato; Toshiaki Shimeno, all of Hyogo, Japan

[73] Assignee: Mitsubishi Jukogyo K.K., Tokyo, Japan

[21] Appl. No.: 379,423

[22] Filed: Jul. 13, 1989

[30] Foreign Application Priority Data

Sep. 24, 1988 [JP] Japan ................................. 63-239339

[51] Int. Cl.⁵ .............................................. G07B 15/00
[52] U.S. Cl. ............................................ 232/7; 232/16
[58] Field of Search .................................. 232/7, 15, 16

[56] References Cited

U.S. PATENT DOCUMENTS

| 3,024,970 | 3/1962 | Powers | 232/7 X |
| 4,186,977 | 2/1980 | Gilovich et al. | 232/15 X |
| 4,201,333 | 5/1980 | Oslin et al. | 232/16 X |
| 4,380,316 | 4/1983 | Glinka et al. | 232/16 |
| 4,795,087 | 1/1989 | Procak | 232/16 X |
| 4,889,279 | 12/1989 | Klabin | 232/15 |

Primary Examiner—Robert W. Gibson, Jr.
Attorney, Agent, or Firm—Stanger, Michaelson, Spivak & Wallace

[57] ABSTRACT

An automatic toll collector for a toll road includes a cashbox receiving a toll thrown into a toll receiving inlet. Trigger holes, address holes and identification number holes are disposed on the bottom surface of the cashbox in a predetermined pattern in an insertion direction of the cashbox and are detected by proximity sensors disposed in the direction perpendicular to the insertion direction of the cashbox to recognize the identification number of the cashbox. Since the identification number is recognized by the correspondence between data of the address holes and data of the identification number, the identification number can be recognized exactly even if the cashbox is retried to be inserted several times.

3 Claims, 6 Drawing Sheets

AUTOMATIC TOLL COLLECTOR FOR A TOLL ROAD

FIELD OF THE INVENTION AND RELATED ART STATeMENT

The present invention relates to an automatic toll collector for a toll road.

As shown in FIG. 6, an automatic toll collecting system for a toll road detects an entrance of a vehicle by an entrance detector 1 and drives an automatic toll collector 2 to receive a toll automatically (in an unattended manner). The automatic toll collector 2 is provided with a display which displays a toll and a toll receiving inlet. When a toll is thrown into the toll receiving inlet, it is confirmed that cash equal to the toll has been thrown into the toll receiving inlet and a start control light 3 is turned from red to blue so that a crossing gate 4 is opened. When the vehicle passes through the crossing gate 4 and a start detector 5 detects the start of the vehicle, the crossing gate 4 is closed and the start control light 3 is turned from blue to red. In FIG. 6, numeral 6 denotes a collection processing unit and numeral 7 denotes a control panel.

FIG. 8 is a flowchart showing an example of an operation of an automatic toll collecting system. When an entrance of a vehicle is detected, the automatic toll collector begins to operate. When coins are received, it is distinguished whether the coins are genuine or counterfeit and kinds of the coins are then identified. When the coins are counterfeit, the reception of the coins is rejected, while when the coins are genuine, the coins are counted and held temporarily. An amount of the coins is subtracted from a set amount to calculate a difference thereof. When the difference is negative, a passage permission signal is generated so that a crossing gate is opened and a signal light is turned from red to blue. The thrown coins are then received in a cashbox. Finally, a start of the vehicle is detected. The process described above is repeated.

The automatic toll collector 2 as described above includes the cashbox disposed detachably therein to receive the coins thrown into the toll receiving inlet. An identification number is attached to each of the cashboxes to identify a place and a time in which the cashbox has been used. As a method of reading the identification number, heretofore, there is considered a method of attaching a label having a bar code 9 printed thereon to each of the cashbox 8 as shown in FIG. 7(a) and reading the bar code 9 by a bar code reader 10 or a method of providing unevennesses 11 representing a binary code data (BCD) on a side of the cashbox 8 as shown in FIG. 7(b) and reading the unevennesses 11 by a photosensor 12. However, since the cashbox used in the automatic toll collector is handled roughly, there is a possibility that the identification number in the form of the bar code can not be read due to dirt, scratch, separation or the like. There is a problem that the reading method by the photosensor tends to be influenced by dust or the like. Further, there is a possibility that the two methods described above can not read the identification number when the cashbox is retried to be inserted into the toll collector several times since the cashbox is not inserted into the toll collector smoothly.

OBJECT AND SUMMARY OF THE INVENTION

The present invention has been made in view of the above problems and an object of the present invention is to provide an automatic toll collector for a toll road which can read and recognize an identification number exactly even if a cashbox is handled somewhat roughly or even under bad environment where there is much dust and even if the cashbox is retried to be inserted several times.

In order to solve the above problems, the automatic toll collector for a toll road according to the present invention comprises a cashbox inserted into a body of the toll collector for receiving coins thrown into a toll receiving inlet, a series of holes for an identification number formed in a bottom surface of the cashbox in a direction of inserting the cashbox to represent the identification number which identifies the cashbox, a series of holes for address disposed in a direction perpendicular to a direction of inserting the cashbox to represent a digit number of the identification number as a binary signal, a trigger hole for generating a trigger signal for reading the digit number to obtain a value of the digit of the identification number, a proximity sensor for the identification number disposed at a portion facing the bottom of the cashbox of the body of the toll collector for detecting a presence of the holes for the identification number, a proximity sensor for address for detecting a presence of the holes for address to read the digit number, and a proximity sensor for trigger to detect a presence of the trigger hole and generate a trigger signal, which are disposed in a line in a direction perpendicular to the direction of inserting the cashbox, whereby when the cashbox is inserted into the body or is pulled out from the body, the digit number and the value of the identification number corresponding to the digit are read each time the presence of the trigger holes is detected so that the identification number of the cashbox is read.

DETAILED DESCRIPTION OF PREFERRED EMBODIMENTS

Referring to FIGS. 1 to 5, an embodiment of the present invention is now described.

Figure 1:
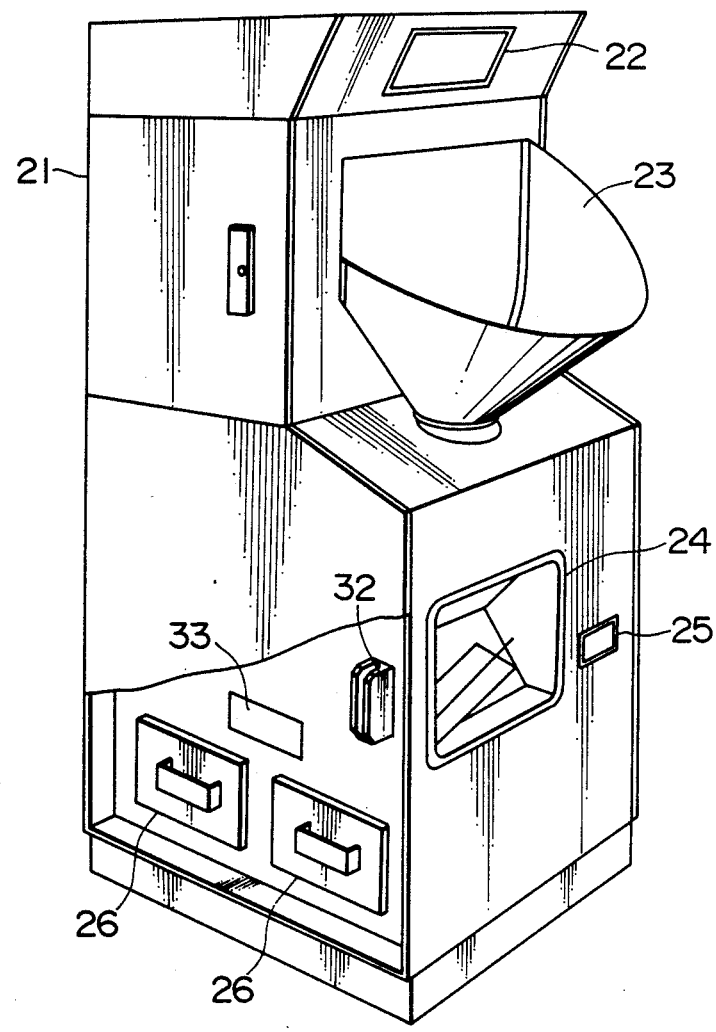
FIG. 1 is a perspective view schematically illustrating an automatic toll collector for a toll road according to the present invention.
Figure 2:
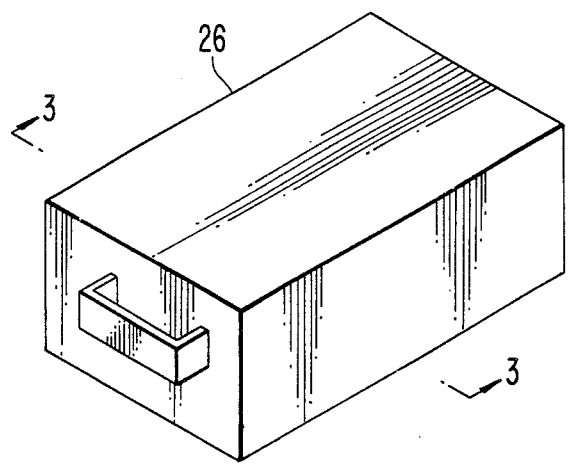
FIG. 2 is a perspective view showing a cashbox provided in the toll collector.

FIG. 1 is a perspective view schematically illustrates an automatic toll collector according to the present invention. In FIG. 1, a display unit 22 and a toll receiving inlet 23 are disposed at an upper front portion of the automatic toll collector 21. A window 24 for confirming coins thrown into the toll collector and a coin discharge outlet 25 for returning change are disposed at a lower front portion of the toll collector 21.

Figure 3:
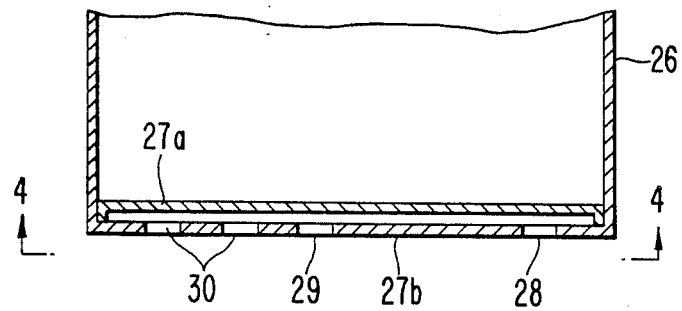
FIG. 3 is a sectional view of the cashbox taken along line III—III of FIG. 2.
Figure 4:
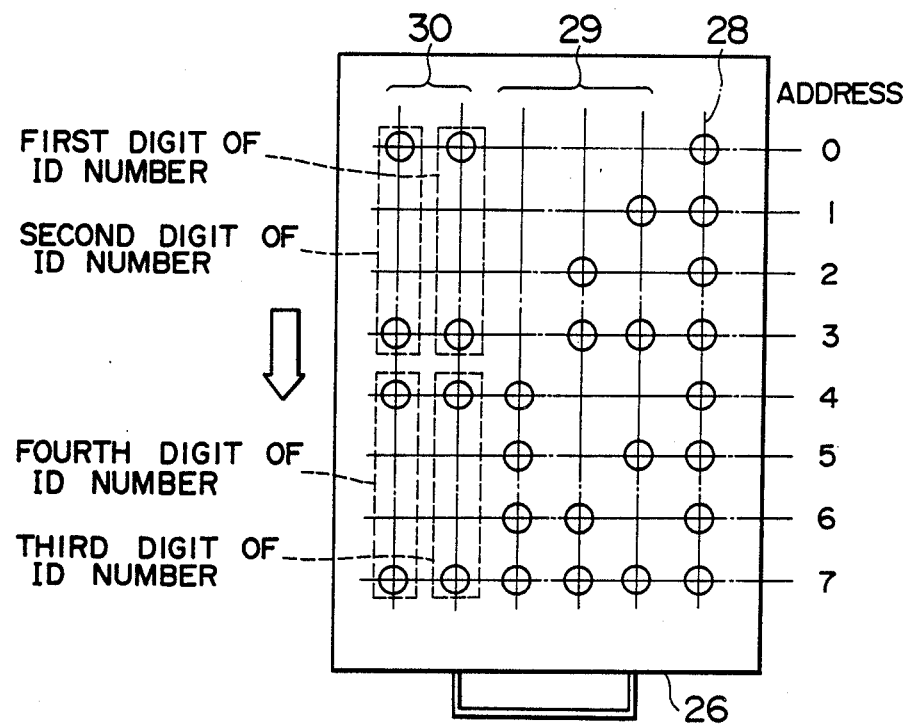
FIG. 4 is a bottom view of the cashbox seen from line IV—IV of FIG. 3.

The coins thrown into the toll receiving inlet 23 are selected by a coin selector and are then received in cashboxes 26 disposed in the bottom of the toll collector 21. The cashboxes 26 has a double-bottom structure including an upper bottom plate 27a and a lower bottom plate 27b as shown in FIG. 3. Trigger holes 28, address holes 29 and identification number holes (hereinafter referred to as ID number holes) 30 are provided in a predetermined pattern in the lower bottom plate 27b along the insertion direction (arrow direction) of the cashbox 26 as shown in FIG. 4.

The trigger holes 28 are formed at regular intervals in the insertion direction of the cashbox 26 to generate a detection timing for the address holes 29 and the ID number holes 30. The address holes 29 are to detect addresses of the ID number holes 30 and are formed with addresses representing "0" to "7" in this embodiment. The ID number holes 30 represent an identification (ID) number of the cashbox 26, and the first and second digits for the ID number are expressed by a four-digit BCD in the addresses "0" to "3" while the third and fourth digits for the ID number are expressed by a four-digit BCD in the addresses "4" to "7".

Figure 5:
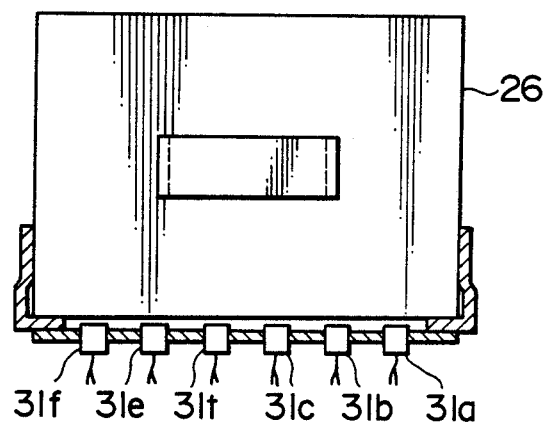
FIG. 5 is a diagram showing proximity sensors disposed at the bottom surface of the cashbox for detecting trigger holes, address holes and identification number holes.
Figure 6:
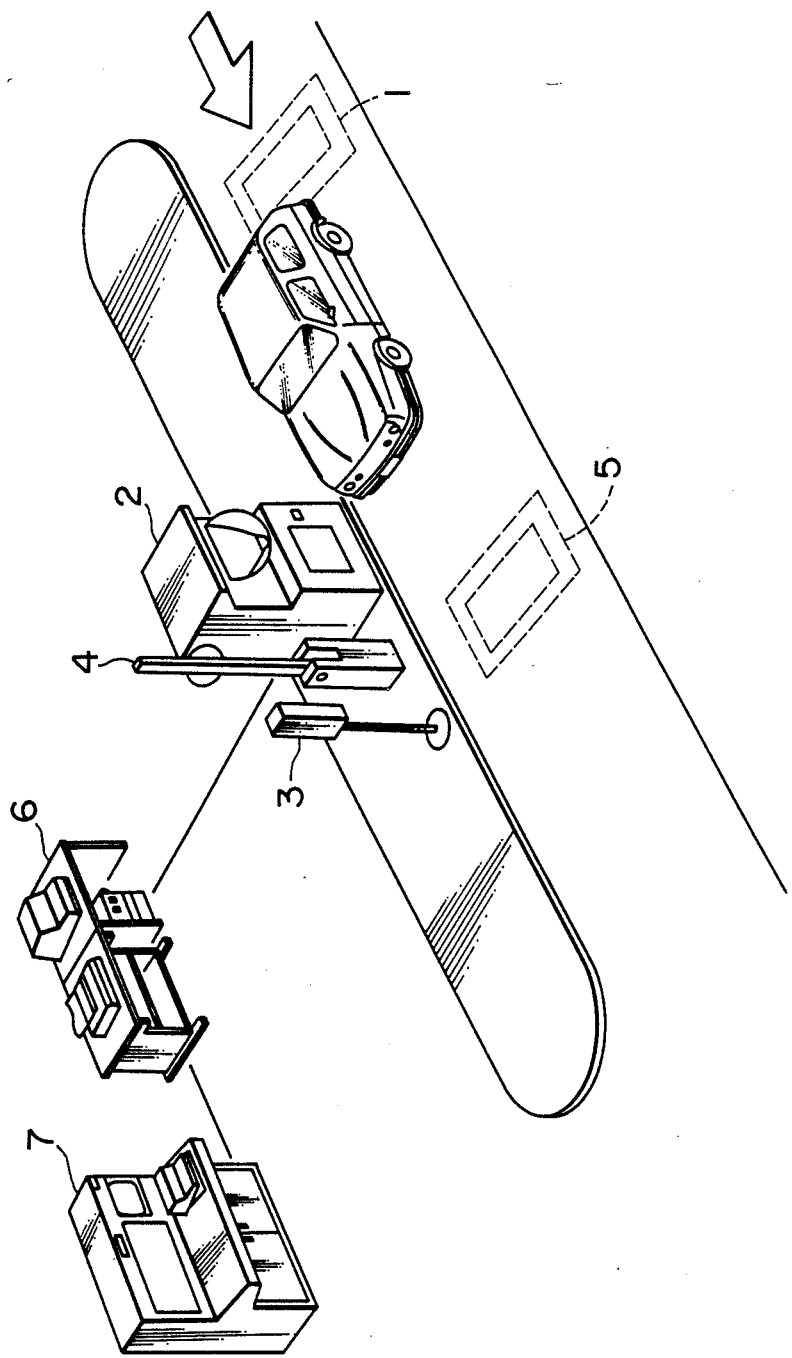
FIG. 6 schematically illustrates an automatic toll collecting system for a toll road.
Figure 7A:
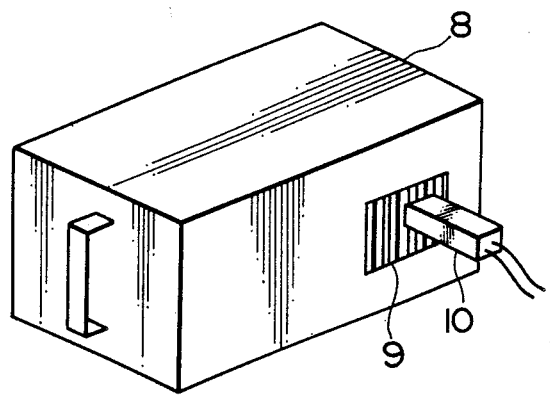
FIGS. 7(a) and 7(b) illustrate conventional methods of recognizing an identification number of a cashbox.
Figure 7B:
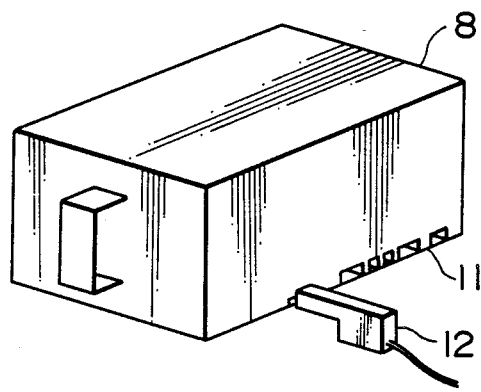
Figure 8:
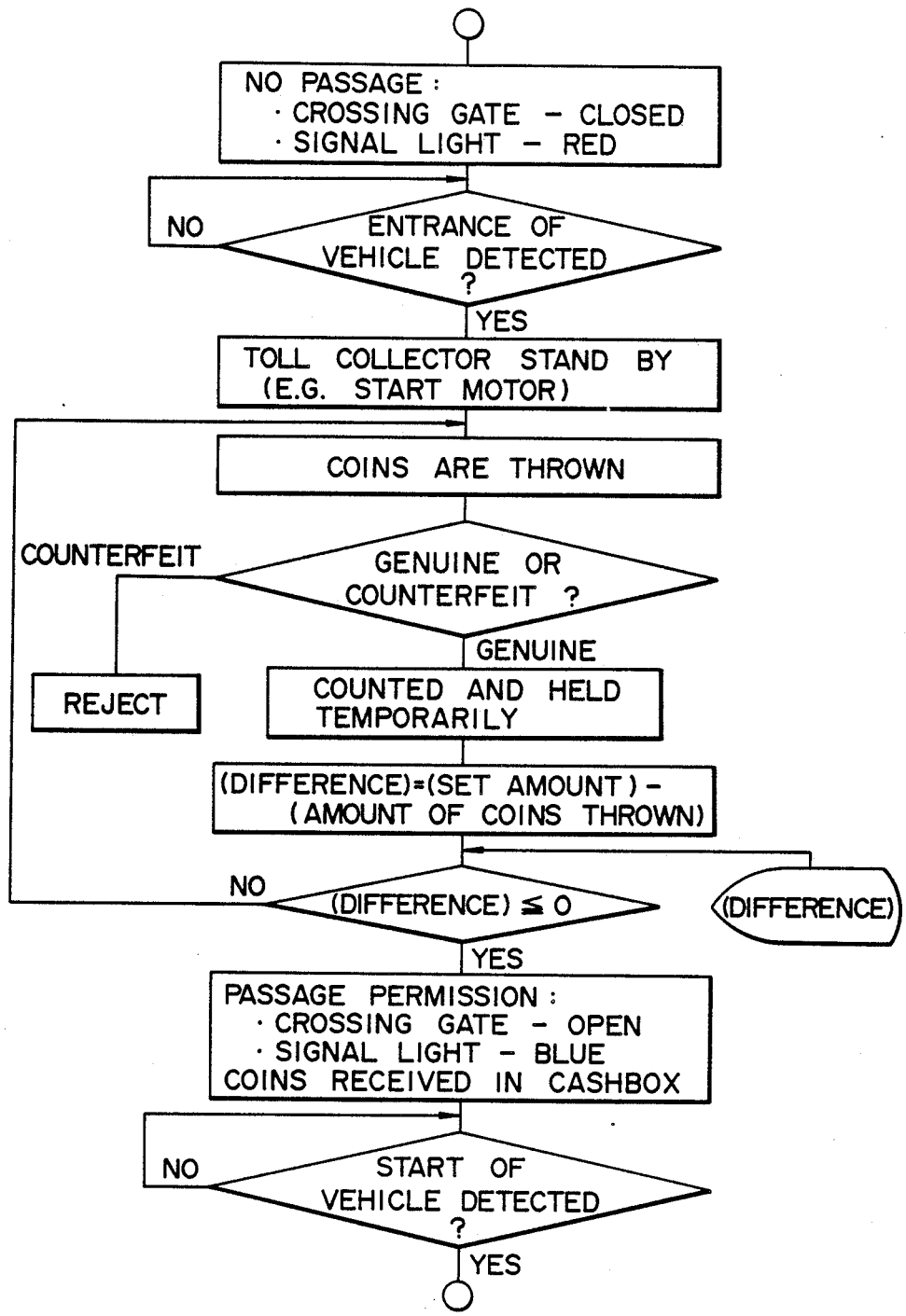
FIG. 8 is a flowchart showing an operation of an example of an automatic toll collecting system.

Further, as shown in FIG. 5, the automatic toll collector 21 is provided with a plurality of proximity sensors 31a, 31b, 31c, 31d, 31e and 31f disposed in a direction perpendicular to the insertion direction of the cashbox 26. The proximity sensors 31a to 31f detect the trigger holes, the address holes 29 and the ID number holes 30 to recognize the ID number. The automatic toll collector is provided with an ID card reader 32 which reads an ID card of a toll keeper or maintenance man and a state-of-cashbox display panel 33 which displays a full state of the cashbox 26.

Operation of the embodiment as structured above is now described.

The ID number of the cashbox 26 is recognized by detecting the trigger holes 28, the address holes 29 and the ID number holes 30 disposed at the bottom surface of the cashbox 26 by the proximity sensors 31a to 31f. More particularly, when the proximity sensors 31a to 31f detects the trigger hole 28, the detected trigger hole 28 is recognized as a reference point of reading the address holes 29 and the ID number holes 30 disposed in the direction perpendicular to the insertion direction of the cashbox 26. Thus, addresses constituted by the address holes 29 are read by the proximity sensors 31b, 31c and 31d and the ID number data constituted of the ID number holes 30 are read by the proximity sensors 31e and 31f. In this connection, when the address data constituted by the address holes 29 is read as "0" to "3", the ID number holes 30 are read as the first and second digits of the ID number, while when the address data constituted by the address holes 29 is read as "4" to "7", the ID number holes 30 are read as the third and fourth digits of the ID number.

The ID number of the cashbox 26 as read above is transmitted to a central processing computer which adds a time data to the ID number to take custody thereof so as to record the toll collector corresponding to the ID number, an amount of cash received by the toll collector and the time from the start of receiving the cash to the end thereof. Further, the data read from the ID card of the toll keeper or maintenance man by the ID card reader 32 provided in the automatic toll collector 21 is transmitted to the central processing computer to confirm that the data corresponds a card number of a normal registrant. After the confirmation, an automatic lock of the cashbox 26 is released and the number of the cashbox pulled out by the toll keeper or maintenance man is recorded.

As described above, according to the present invention, in the automatic toll collector for a toll road including the cashbox which receives a toll thrown into the toll receiving inlet, the trigger holes, the address holes and the ID number holes are provided on the bottom surface of the cashbox in a predetermined pattern along the insertion direction of the cashbox and are detected by the proximity sensors disposed in the direction perpendicular to the insertion direction of the cashbox to read the ID number of the cashbox. Accordingly, the ID number can be read exactly even if the cashbox is handled slightly roughly or even under bad environment where there is dust. Further, since the ID number is recognized by the correspondence between the data constituted by the address holes and the data constituted by the ID number holes, the ID number can be recognized exactly even if the cashbox is retried to be inserted several times.

We claim:

1. An automatic toll collector for a toll road comprising a cashbox inserted into a body of the toll collector for receiving coins thrown into a toll receiving inlet, a series of holes for an identification number formed in a bottom surface of the cashbox in a direction of inserting the cashbox to represent the identification number which identifies the cashbox, a series of holes for digit numbers disposed in a direction perpendicular to a direction of inserting the cashbox to represent a digit number of the identification number as a binary signal, a trigger hole for generating a trigger signal for reading the digit number to obtain a value of the digit of the identification number, a proximity sensor for the identification number disposed at a portion facing the bottom of the cashbox of the body of the toll collector for detecting a presence of the holes for the identification number, a proximity sensor for digit numbers for detecting a presence of the holes for digit numbers to read the digit number, and a proximity sensor for trigger to detect a presence of the trigger hole and generate a trigger signal, which are disposed in a line in a direction perpendicular to the direction of inserting the cashbox whereby when the cashbox is inserted into the body or is pulled out from the body, the digit number and the value of the identification number corresponding to the digit are read each time the presence of the trigger holes is detected so that the identification number of the cashbox is read.

2. An automatic toll collector for a toll road, according to claim 1, wherein said identification number is expressed by a binary-coded decimal (BCD).

3. An automatic toll collector for a toll road, according to claim 2, wherein the identification number is expressed by four digits of BCD.

* * * * *